United States Patent
Tsuchida et al.

(10) Patent No.: US 8,125,149 B2
(45) Date of Patent: Feb. 28, 2012

(54) PLASMA DISPLAY PANEL, METHOD OF MANUFACTURING THE SAME, AND PASTE FOR DISPLAY ELECTRODES OF PLASMA DISPLAY PANEL

(75) Inventors: Shuzo Tsuchida, Nara (JP); Akinobu Miyazaki, Osaka (JP); Tsutomu Koshizuka, Osaka (JP); Akira Kawase, Hyogo (JP)

(73) Assignee: Panasonic Corporation, Osaka (JP)

( * ) Notice: Subject to any disclaimer, the term of this patent is extended or adjusted under 35 U.S.C. 154(b) by 254 days.

(21) Appl. No.: 12/296,047

(22) PCT Filed: Feb. 15, 2008

(86) PCT No.: PCT/JP2008/000228
§ 371 (c)(1), (2), (4) Date: Oct. 3, 2008

(87) PCT Pub. No.: WO2008/099613
PCT Pub. Date: Aug. 21, 2008

(65) Prior Publication Data
US 2009/0284151 A1    Nov. 19, 2009

(30) Foreign Application Priority Data
Feb. 16, 2007    (JP) .................................. 2007-036109

(51) Int. Cl.
*H01J 17/49*    (2006.01)
(52) U.S. Cl. ......................................... 313/586; 445/24
(58) Field of Classification Search .......... 313/582–587, 313/41, 60, 71; 252/500–521.6; 345/37, 345/41, 60, 71
See application file for complete search history.

(56) References Cited

U.S. PATENT DOCUMENTS

| | | | |
|---|---|---|---|
| 6,297,590 B1 | 10/2001 | Nanto et al. | |
| 7,002,297 B2* | 2/2006 | Aoki et al. | 313/584 |
| 2001/0040433 A1 | 11/2001 | Awaji et al. | |
| 2002/0000774 A1 | 1/2002 | Awaji et al. | |
| 2002/0079840 A1 | 6/2002 | Onoda et al. | |
| 2005/0089794 A1* | 4/2005 | Fukushima | 430/270.1 |
| 2006/0276322 A1 | 12/2006 | Hasegawa et al. | |
| 2009/0042715 A1* | 2/2009 | Uchiyama et al. | 501/78 |

FOREIGN PATENT DOCUMENTS

| | | |
|---|---|---|
| EP | 1 933 353 A1 | 6/2008 |
| JP | 11-213893 | 8/1999 |
| JP | 2000-11900 | 1/2000 |

(Continued)

OTHER PUBLICATIONS

European Search Report issued in European Patent Application No. 08710382.6-2208, mailed Apr. 21, 2010.

(Continued)

*Primary Examiner* — Nimeshkumar Patel
*Assistant Examiner* — Donald Raleigh
(74) *Attorney, Agent, or Firm* — McDermott Will & Emery LLP

(57) ABSTRACT

A plasma display panel includes a pair of substrates which are opposite to each other and one of which includes display electrodes (6) and a dielectric layer (8) formed thereon, and the display electrodes (6) are made of a glass material containing 0.1 wt % to 5 wt % of at least one oxide of molybdenum, cerium, copper, tin, manganese, ruthenium, antimony, and iron.

10 Claims, 4 Drawing Sheets

FOREIGN PATENT DOCUMENTS

| | | |
|---|---|---|
| JP | 2000-048645 | 2/2000 |
| JP | 2000-48645 | 2/2000 |
| JP | 2000-82409 | 3/2000 |
| JP | 2002-020138 | 1/2002 |
| JP | 2002-20138 | 1/2002 |
| JP | 2002020138 A * | 1/2002 |
| JP | 2003-238607 | 8/2003 |
| JP | 2005-135831 | 5/2005 |
| JP | 2006-344483 | 12/2006 |
| JP | 2007-42554 | 2/2007 |
| JP | 2007-042554 | 2/2007 |
| KR | 2003-0069068 | 8/2003 |
| WO | WO 2006/107052 A1 | 10/2006 |
| WO | WO 2007/040142 A1 | 4/2007 |
| WO | WO 2007075190 A1 * | 7/2007 |

OTHER PUBLICATIONS

Chinese Office Action issued in Chinese Patent Application No. CN 200880000413.2 dated Apr. 27, 2010.

Korean Office Action issued in Korean Patent Application No. KR 10-2008-7032074 dated Aug. 30, 2010.

* cited by examiner

PLASMA DISPLAY PANEL, METHOD OF MANUFACTURING THE SAME, AND PASTE FOR DISPLAY ELECTRODES OF PLASMA DISPLAY PANEL

RELATED APPLICATIONS

This application is the U.S. National Phase under 35 U.S.C. §371 of International Application No. PCT/JP2008/000228, filed on Feb. 15, 2008, which in turn claims the benefit of Japanese Application No. 2007-036109, filed on Feb. 16, 2007, the disclosures of which Applications are incorporated by reference herein.

TECHNICAL FIELD

The present invention relates to a plasma display panel used for, for example, a display device, a method of manufacturing the same, and paste for display electrodes of the plasma display panel.

BACKGROUND ART

Plasma display panels (hereinafter, referred to as PDPs) can display high-resolution images on a large screen, and a 65-inch plasma display panel has been manufactured. In recent years, a high-definition plasma display panel in which the number of scanning lines is two or more times larger than that of a conventional NTSC standard has been developed and a reduction in manufacturing costs has been required.

The PDP basically includes a front panel and a rear panel. The front panel includes a glass substrate that is formed of sodium borosilicate-based glass by a floating method, strip-shape display electrodes which are formed on one main surface of the glass substrate and each of which includes a transparent electrode and a metal bus electrode, a dielectric layer, serving as a capacitor, that covers the display electrodes, and a protective layer that is made of a magnesium oxide (MgO) and is formed on the dielectric layer. Meanwhile, the rear panel includes a glass substrate, strip-shaped address electrodes that are formed on one main surface of the glass substrate, an underlying dielectric layer that covers the address electrodes, barrier ribs that are formed on the underlying dielectric layer, and phosphor layers that are formed between the barrier ribs and emit red, green, and blue light.

The gap between the front panel and the rear panel is sealed with the electrode formed surfaces thereof facing each other, and a discharge gas, such as neon (Ne) or xenon (Xe), is injected into a discharge space partitioned by the barrier ribs at a pressure of 53000 Pa to 80000 Pa. In the PDP, an image signal voltage is selectively applied to the display electrodes to generate a discharge, and ultraviolet rays generated by the discharge excite color phosphor layers to emit red, green, and blue light, thereby displaying a color image.

Silver electrodes are used as the metal bus electrodes of the display electrodes in order to ensure conductivity, and a low melting point glass having a lead oxide as a main ingredient is used as the dielectric layer. However, in recent years, a dielectric layer not containing lead has been proposed considering environmental problems. In addition, a material containing a predetermined amount of bismuth oxide has been proposed as binder glass for forming the bus electrodes (for example, see Patent Document 1).

Meanwhile, in recent years, with the development of high-definition televisions, the number of scanning lines has increased, and the number of display electrodes has increased. Therefore, the area of the display electrodes increases, and thus the amount of organic components remaining in the display electrodes increases. The organic components are burned in the subsequent dielectric layer forming process to generate bubbles from the dielectric layer. As a result, the generation of bubbles from the dielectric layer is remarkably increased, and image quality is significantly lowered. In addition, discharge errors occur due to, for example, insufficient insulation of the dielectric layer, and the manufacturing yield of PDPs is reduced.

In order to solve these problems, the related art discloses measures to remove the organic components remaining in the dielectric layer, but does not disclose any measures to prevent the generation of bubbles due to the organic components remaining in the display electrode.

[Patent Document 1] Japanese Patent Unexamined Publication No. 2000-048645

DISCLOSURE OF THE INVENTION

According to an aspect of the invention, a plasma display panel includes a pair of substrates which are opposite to each other and one of which includes display electrodes and a dielectric layer formed thereon, and the display electrodes are made of a glass material containing 0.1 wt % to 5 wt % of at least one oxide of molybdenum, cerium, copper, tin, manganese, ruthenium, antimony, and iron.

According to the above-mentioned structure, it is possible to provide a PDP capable of reducing discharge errors due to, for example, insufficient insulation of a dielectric layer to improve manufacturing yield even in a high-resolution display and ensuring high brightness and high reliability to improve image display quality.

DESCRIPTION OF REFERENCE NUMERALS AND SIGNS

1: PDP
2: FRONT PANEL
3: FRONT GLASS SUBSTRATE
4: SCANNING ELECTRODE
4a, 5a: TRANSPARENT ELECTRODE
4b, 5b: METAL BUS ELECTRODE
5: SUSTAIN ELECTRODE

6: DISPLAY ELECTRODE
7: LIGHT SHIELDING LAYER
8: DIELECTRIC LAYER
9: PROTECTIVE LAYER
10: REAR PANEL
11: REAR GLASS SUBSTRATE
12: ADDRESS ELECTRODE
13: UNDERLYING DIELECTRIC LAYER
14: BARRIER RIB
15: PHOSPHOR LAYER
16: DISCHARGE SPACE
41b, 51b: BLACK ELECTRODE
42b, 52b: WHITE ELECTRODE
81: FIRST DIELECTRIC LAYER
82: SECOND DIELECTRIC LAYER

PREFERRED EMBODIMENTS FOR CARRYING
OUT THE INVENTION

Hereinafter, a PDP according to an embodiment of the invention will be described with reference to the accompanying drawings.

Embodiments

Figure 1:
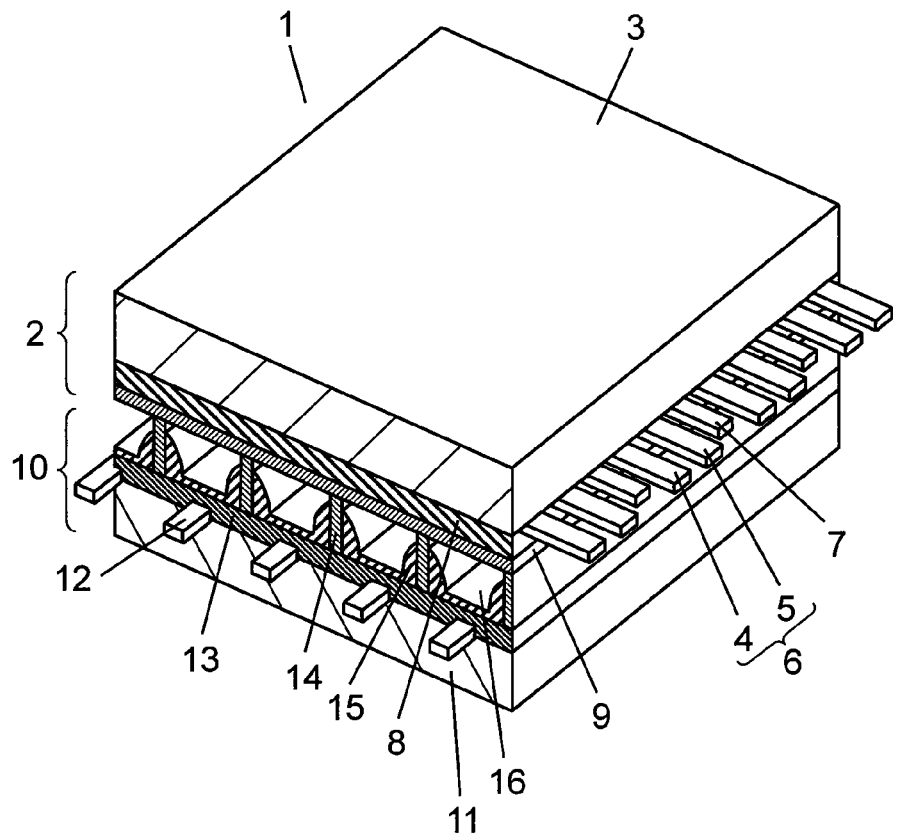
FIG. 1 is a perspective view illustrating the structure of a PDP according to an embodiment of the invention.

FIG. 1 is a perspective view illustrating the structure of a PDP according to an embodiment of the invention. The basic structure of the PDP according to this embodiment of the invention is the same as that of a general AC surface discharge PDP. As shown in FIG. 1, PDP 1 includes front panel 2 including, for example, front glass substrate 3, rear panel 10 that includes, for example, rear glass substrate 11 and is opposite to the front panel, and an outer circumferential portion of the PDP is sealed by a sealing material, such as glass frit. A discharge gas, such as Ne or Xe, is injected into sealed discharge space 16 of PDP 1 at a pressure of 53000 Pa to 80000 Pa.

A plurality of pairs of strip-shaped display electrodes 6, each including scanning electrode 4 and sustain electrode 5, and light shielding layers 7 are provided on front glass substrate 3 of front panel 2 so as to be parallel to each other. Dielectric layer 8, serving as a capacitor, is formed on front glass substrate 3 so as to cover display electrodes 6 and light shielding layers 7, and protective layer 9 formed of, for example, a magnesium oxide is formed on the surface of the dielectric layer.

Further, a plurality of strip-shaped address electrodes 12 are formed on rear glass substrate 11 of rear panel 10 so as to be parallel to each other in a direction that is orthogonal to scanning electrode 4 and sustain electrodes 5 of front panel 2, and underlying dielectric layer 13 covers the address electrodes. In addition, barrier ribs 14 that have a predetermined height and partition discharge space 16 are formed on underlying dielectric layer 13 between address electrodes 12. Phosphor layers 15 that emit red, blue, and green light by ultraviolet rays are sequentially formed on each address electrode 12 in a groove between barrier ribs 14. Discharge cells are formed at intersections of scanning electrodes 4, sustain electrodes 5, and address electrodes 12, and the discharge cells including red, green, blue phosphor layers 15 that are arranged in a direction in which display electrode 6 extends serve as pixels for color display.

Figure 2:
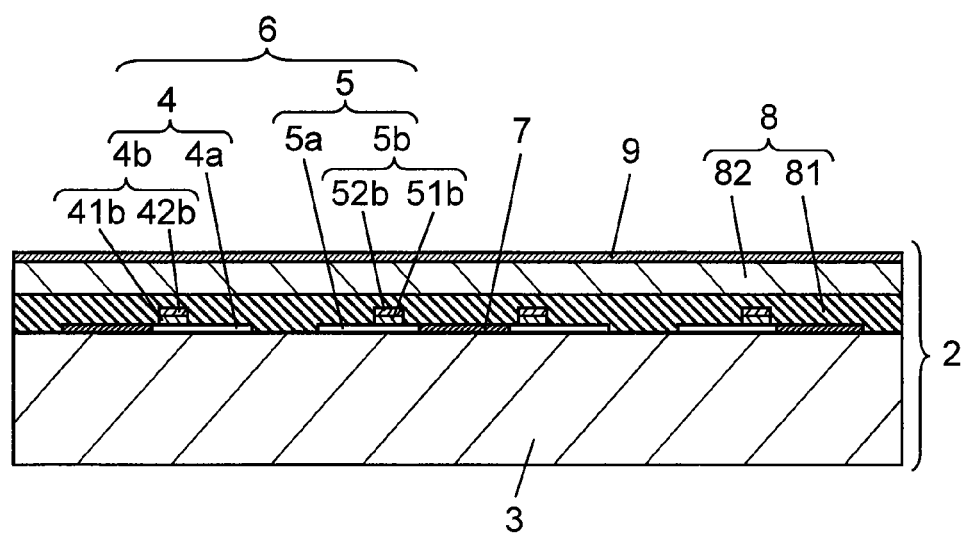
FIG. 2 is a cross-sectional view illustrating the structure of a front panel of the PDP.

FIG. 2 is a cross-sectional view illustrating the structure of front panel 2 of PDP 1 according to the embodiment of the invention. FIG. 2 is a reversed view of FIG. 1 in the vertical direction. As shown in FIG. 2, display electrodes 6, each including scanning electrode 4 and sustain electrode 5, and light shielding layers 7 are patterned on front glass substrate 3, which is manufactured by a floating method. Scanning electrode 4 and sustain electrode 5 include transparent electrodes 4a and 5a made of, for example, indium oxide (ITO) or tin oxide ($SnO_2$), and metal bus electrodes 4b and 5b that are formed on transparent electrodes 4a and 5a, respectively. Metal bus electrodes 4b and 5b are used to give conductivity in the longitudinal direction of transparent electrodes 4a and 5a, respectively, and are formed of a conductive material having a silver (Ag) material as a main ingredient. Further, metal bus electrode 4b and 5b include black electrodes 41b and 51b and white electrodes 42b and 52b, respectively.

Dielectric layer 8 has an at least two-layer structure of first dielectric layer 81 that covers transparent electrodes 4a and 5a, metal bus electrodes 4b and 5b, and light shielding layers 7 formed on front glass substrate 3 and second dielectric layer 82 formed on first dielectric layer 81, and protective layer 9 is formed on second dielectric layer 82.

Next, a method of manufacturing front panel 2 of PDP 1 will be described. First, scanning electrodes 4, sustain electrodes 5, and light shielding layers 7 are formed on front glass substrate 3. Transparent electrode 4a and 5a and metal bus electrodes 4b and 5b of the scanning electrodes and the sustain electrodes are patterned by, for example, a photolithography method. Transparent electrodes 4a and 5a are formed by, for example, a thin film process, and metal bus electrodes 4b and 5b are formed by hardening paste including a silver (Ag) material or a black pigment at a predetermined temperature. Similarly, light shielding layers 7 are formed by a method of performing screen printing on paste including a black pigment or a method of applying a black pigment on the entire surface of front glass substrate 3, patterning it using a photolithography method, and baking it.

Metal bus electrodes 4b and 5b are generally formed by the following process. After paste including a black pigment is printed on front glass substrate 3 and then dried, the paste is patterned by the photolithography method to form light shielding layers 7. Then, a process of printing paste including pigment and paste including conductive particles on the light shielding layers and drying the pastes is repeatedly performed to form black electrode paste layers of black electrodes 41b and 51b and white electrode paste layers of white electrodes 42b and 52b. Thereafter, the paste layers are patterned by the photolithography method to form metal bus electrodes 4b and 5b including black electrodes 41b and 51b and white electrodes 42b and 52b. In order to improve the contrast during image display, black electrodes 41b and 51b are formed on a lower side (on the side of front glass substrate 3), and white electrodes 42b and 52b are formed on an upper side.

Black electrodes 41b and 51b of metal bus electrodes 4b and 5b and light shielding layers 7 may be formed of the same material. However, in this case, since light shielding layers 7 contain a conductive material, it is necessary to consider a discharge error during image display.

Then, a dielectric paste is applied on front glass substrate 3 by a die coating method so as to cover scanning electrodes 4, sustain electrodes 5, and light shielding layers 7, thereby forming a dielectric paste layer (dielectric glass layer). After the dielectric paste is applied, the glass substrate is left as it is for a predetermined time, and the surface of the applied dielectric paste is leveled. Then, the dielectric paste layer is hardened by baking, thereby forming dielectric layer 8 covering scanning electrodes 4, sustain electrodes 5, and light shielding layers 7.

In this embodiment of the invention, at least the process of applying the dielectric paste is repeated to form dielectric layer 8 having a two-layer structure of first dielectric layer 81 and second dielectric layer 82. The dielectric paste is paint including dielectric glass powder, a binder, and a solvent.

Then, protective layer 9 made of a magnesium oxide (MgO) is formed on dielectric layer 8 by a vapor deposition method. In this way, predetermined constituent members are formed on front glass substrate 3, and front panel 2 is completed.

Meanwhile, rear panel 10 is manufactured as follows. First, a material layer composed of a constituent material for address electrode 12 is formed on rear glass substrate 11 by, for example, a method of performing screen printing on paste including a silver (Ag) material or a method of forming a metal film on the entire surface of the substrate and patterning the film using the photolithography method. Then, the material layer is baked at a predetermined temperature to form address electrodes 12. Then, a dielectric paste is applied on rear glass substrate 11 having address electrodes 12 formed thereon by a die coating method so as to cover address electrodes 12, thereby forming an underlying dielectric paste layer. Thereafter, the underlying dielectric paste layer is baked to form underlying dielectric layer 13. The dielectric paste is paint including a dielectric material, such as glass powder, a binder, and a solvent.

Then, a barrier rib material paste including a barrier rib material is applied onto underlying dielectric layer 13 to form a barrier rib paste layer, and the layer is patterned into a predetermined shape and then baked, thereby forming barrier ribs 14. In this case, for example, the photolithography method or a sandblast method can be used to pattern the barrier rib paste layer formed on underlying dielectric layer 13. Then, a phosphor paste including a phosphor material is applied on underlying dielectric layer 13 between adjacent barrier ribs 14 and on the side walls of barrier ribs 14, and then baked to form phosphor layers 15. In this way, rear panel 10 having predetermined constituent members on rear glass substrate 11 is completed.

Then, front panel 2 and rear panel 10 having predetermined constituent members provided therein are arranged opposite to each other such that scanning electrodes 4 are orthogonal to address electrodes 12, and the edges thereof are sealed by glass frit. Then, a discharge gas, such as neon (Ne) or xenon (Xe), is injected into discharge space 16, thereby completing PDP 1.

Next, black electrodes 41b and 51b forming metal bus electrode 4b and 5b of front panel 2 will be described in detail. Black electrodes 41b and 51b are made of a glass material having the following material composition. That is, a glass material containing 15 wt % to 40 wt % of bismuth oxide ($Bi_2O_3$) and 3 wt % to 20 wt % of silicon oxide ($SiO_2$), and 10 wt % to 45 wt % of boron oxide ($B_2O_3$) is used as a basic material. Further, the glass material contains 0.1 wt % to 5 wt % of at least one oxide of molybdenum (Mo), ruthenium (Ru), cerium (Ce), tin (Sn), copper (Cu), manganese (Mn), antimony (Sb), and iron (Fe). In addition, the contents of these materials are adjusted such that they are uniformly vitrified.

In this embodiment of the invention, the softening temperature of the glass material forming black electrodes 41b and 51b is in a range of 400° C. to 550° C. Black electrodes 41b and 51b include a black pigment in order to improve the contrast during image display. The black pigment is precipitated on the substrate, that is, front glass substrate 3 in this embodiment of the invention, during the baking of electrodes, thereby ensuring the contrast of front glass substrate 3. When the softening temperature of the glass material forming black electrodes 41b and 51b is decreased, the viscosity of glass during baking is lowered, and the black pigment is likely to be precipitated. Therefore, it is possible to decrease an L* value (L*a*b* color system) that was defined by the CIE (Commission International de L'Eclairage) in 1976 in order to digitize color, and it is possible to improve the contrast during image display. Therefore, in this embodiment of the invention, the softening temperature of the glass material forming black electrodes 41b and 51b is set in the range of 400° C. to 550° C. such that the shape of the electrode is maintained in the subsequent manufacturing process.

However, the following method is generally used to add an additive to, for example, the paste material to obtain the desired effects. For example, first, a printing method or a die coating method is used to apply paste. When the paste requires heat treatment, the paste includes organic components, such as glass frit, a plasticizer, a binder, and a solvent. Therefore, an additive, such as metal or metal oxide, is added to the paste. However, when this method is used for an electrode material of a PDP, the following problems arise.

That is, in the paste used as an electrode material, for example, conductive particles and black pigment are mixed with a glass material. Therefore, when an additive, such as a metal oxide, is added to the electrode material paste, the conductive particles, the black pigment, and the glass material, and additive particles are mixed with each other. As a result, it is very difficult to uniformly disperse metal or metal oxide added to the entire electrode. That is, when observing the entire electrode, a portion showing the effect of the additive and the other portion not showing the effect of the additive are mixed with each.

Meanwhile, it is possible to obtain the effect of the additive from the entire electrode by increasing the content of the additive. However, when the content of the additive increases, the ratio of conductive particles (for example, Ag particles) in a solid component of the paste is reduced, which results in an increase in electric resistance.

In order to solve the above problems, in the embodiment of the invention, an additive is added in a stage of making the glass material. That is, each particle of the glass material contains a metal oxide, which is the additive.

The glass material is made by the following method. Specifically, a first material powder, which is a main material powder including 15 wt % to 40 wt % of bismuth oxide ($Bi_2O_3$), 3 wt % to 20 wt % of silicon oxide ($SiO_2$), and 10 wt % to 45 wt % of boron oxide ($B_2O_3$), is mixed with a second material powder including at least one oxide of molybdenum (Mo), ruthenium (Ru), cerium (Ce), tin (Sn), copper (Cu), manganese (Mn), antimony (Sb), and iron (Fe) in a material powder mixing step. In this case, the mixture ratio is adjusted such that the content of the second material powder is in a range of 0.1 wt % to 5 wt %.

Then, a molten glass making step of melting the mixed material powder at a temperature of about 1000° C. to 1600° C. to make molten glass is performed, and the molten glass is cooled down to be hardened, thereby making a glass material. The glass material is ground by wet jet milling or ball milling such that an average particle diameter is in a range of 0.5 μm to 2.5 μm in a glass material powder making step, thereby making a glass material powder for a black electrode. Then, in an electrode material making step, 15 wt % to 30 wt % of glass material powder for a black electrode, 10 wt % to 45 wt % of organic resin binder, and 5 wt % to 15 wt % of black pigment are kneaded well other by three rollers to make a black electrode paste for die coating or printing.

The organic binder is ethylene glycol containing 5 wt % to 25 wt % of acrylic resin, and contains 5 wt % or less of photosensitive initiator. In addition, if necessary, as a plasticizer, dioctyl phthalate, dibutyl phthalate, triphenyl phosphate, and tributyl phosphate may be added to the paste, and for example, glycerol monooleate, sorbitan sesquioleate, and phosphoric ester of an alalkyl group may be added to the paste as a dispersant, thereby improving printability.

According to this method, since a metal oxide is included in the glass material powder for an electrode as an additive, the additive is uniformly dispersed in the entire electrode, and it is possible to obtain the effect of the added metal oxide from the entire electrode.

Next, white electrodes 42b and 52b will be described in detail. White electrodes 42b and 52b are made of a glass material having the following material composition.

A glass material including 15 wt % to 40 wt % of bismuth oxide ($Bi_2O_3$), 3 wt % to 20 wt % of silicon oxide ($SiO_2$), and 10 wt % to 45 wt % of boron oxide ($B_2O_3$) is basically used. In addition, the glass material contains 0.1 wt % to 5 wt % of at least one oxide of molybdenum (Mo), ruthenium (Ru), cerium (Ce), tin (Sn), copper (Cu), manganese (Mn), antimony (Sb), and iron (Fe). When the content of the elements in the glass material increases, uniform vitrification may not be obtained. Therefore, it is effective to adjust the content according to circumstances.

The glass material is made by the same method as that used to make the glass material for black electrodes 41b and 51b. That is, a first material powder including 15 wt % to 40 wt % of bismuth oxide ($Bi_2O_3$), 3 wt % to 20 wt % of silicon oxide ($SiO_2$), and 10 wt % to 45 wt % of boron oxide ($B_2O_3$) is mixed with powder of the above-mentioned oxide, which is a second material powder, and the mixed material powder is melted to make molten glass. Then, the glass material is ground by wet jet milling or ball milling such that an average particle diameter is in a range of 0.5 μm to 2.5 μm, thereby making a glass material powder for a white electrode. Then, 0.5 wt % to 20 wt % of glass material powder for a white electrode, 1 wt % to 20 wt % of organic binder, and 50 wt % to 85 wt % of conductive particles, such as Ag or Pt particles, are kneaded well by three rollers to make a white electrode paste for die coating or printing. The organic binder is ethylene glycol containing 1 wt % to 20 wt % of acrylic resin, and contains 5 wt % or less of photosensitive initiator. In addition, if necessary, as a plasticizer, dioctyl phthalate, dibutyl phthalate, triphenyl phosphate, and tributyl phosphate may be added to the paste, and, for example, glycerol monooleate, sorbitan sesquioleate, and phosphoric ester of an alalkyl group may be added to the paste as a dispersant, thereby improving printability.

Then, the black electrode paste and the white electrode paste are sequentially coated on front glass substrate 3 by a die coating method or a screen printing method. Then, the coated film is dried and then exposure with a light intensity of 50 mj/cm$^2$ to 500 mj/cm$^2$ is performed on a predetermined area of the coated film using an exposure mask having a predetermined pattern. Then, the film is developed with, for example, 0.1 wt % to 10 wt % of alkali solution to form two-layer metal bus electrodes 4b and 5b including black electrodes 41b and 51b and white electrodes 42b and 52b on transparent electrodes 4a and 5a, thereby forming scanning electrodes 4 and sustain electrodes 5.

As described above, when black electrodes 41b and 51b forming display electrodes 6 and light shielding layers 7 are formed of the same material, it is possible to pattern light shielding layers 7 by the same method as described above.

It is preferable that the thickness of black electrodes 41b and 51b and white electrodes 42b and 52b be in a range of 0.5 μm to 10 μm in order to ensure the width accuracy of the electrodes when the electrodes are patterned by development.

In addition, it is possible to adjust the thickness of the electrodes in order to finely adjust the resistances of the electrodes.

Next, the action of the metal oxide added to metal bus electrodes 4b and 5b according to the embodiment of the invention will be described. In the paste, the metal oxide, which is an additive, accelerates the burning of the organic binder contained in the paste. That is, the metal oxide serves as an oxidizer. For example, the bismuth oxide ($Bi_2O_3$) in the paste also serves as the oxidizer, but the degree of oxidation thereof is small. Therefore, in this embodiment of the invention, at least one oxide of molybdenum (Mo), ruthenium (Ru), cerium (Ce), tin (Sn), copper (Cu), manganese (Mn), antimony (Sb), and iron (Fe) is added as the additive to accelerate the burning of the organic binder in the process of baking metal bus electrodes 4b and 5b. As a result, it is possible to prevent the generation of bubbles from dielectric layer 8.

As in the related art, when the additive is directly mixed with the paste, the content of the additive in the entire paste is reduced, and the additive is scattered in the paste or the electrode layer. Therefore, in the related art, there are a portion showing the effect of the additive, that is, the effect of accelerating the burning of the organic binder and a portion not showing the effect of the additive in the paste, which makes it difficult to prevent the generation of bubbles.

In contrast, in this embodiment of the invention, as described above, as the glass material forming the paste, a glass material having the additive mixed therewith in advance is used. Therefore, after the paste is applied and melted, the additive is uniformly dispersed in the electrode, and it is possible to obtain the effect of preventing the generation of bubbles from the entire electrode.

Therefore, in front panel 2 of PDP 1 manufactured as described above, at least one oxide of molybdenum (Mo), ruthenium (Ru), cerium (Ce), tin (Sn), copper (Cu), manganese (Mn), antimony (Sb), and iron (Fe) serves as a catalyst for accelerating the burning of the organic component in metal bus electrodes 4b and 5b in the process of baking display electrodes 6. Thus, in the subsequent process of forming dielectric layer 8, it is possible to prevent the generation of bubbles from dielectric layer 8, and reduce defects, such as discharge errors, due to bubbles. As a result, it is possible to improve the manufacturing yield of PDPs.

Next, first dielectric layer 81 and second dielectric layer 82 forming dielectric layer 8 of front panel 2 will be described in detail. A dielectric material forming first dielectric layer 81 has the following material composition. That is, the material forming the dielectric layer includes 5 wt % to 40 wt % of bismuth oxide ($Bi_2O_3$) and 0.5 wt % to 15 wt % of calcium oxide (CaO), and further includes 0.1 wt % to 7 wt % of at least one of molybdenum oxide ($MoO_3$), tungsten oxide ($WO_3$), cerium oxide ($CeO_2$), and manganese oxide ($MnO_2$). Furthermore, the dielectric material includes 0.5 wt % to 12 wt % of at least one of strontium oxide (SrO) and barium oxide (BaO).

The dielectric material may include 0.1 wt % to 7 wt % of at least one of copper oxide (CuO), chrome oxide ($Cr_2O_3$), cobalt oxide ($CO_2O_3$), vanadium oxide ($V_2O_7$), and antimony oxide ($Sb_2O_3$), instead of molybdenum oxide ($MoO_3$), tungsten oxide ($WO_3$), cerium oxide ($CeO_2$), and manganese oxide ($MnO_2$).

Further, as components other than the above, the dielectric material may include material compositions not containing lead, such as 0 wt % to 40 wt % of zinc oxide (ZnO), 0 wt % to 35 wt % of boron oxide ($B_2O_3$), 0 wt % to 15 wt % of silicon oxide ($SiO_2$), and 0 wt % to 10 wt % of aluminum oxide ($Al_2O_3$).

The dielectric material having the above composition is ground by wet jet milling or ball milling such that an average particle diameter is in a range of 0.5 μm to 2.5 μm, thereby making dielectric material powder. Then, 55 wt % to 70 wt % of dielectric material powder and 30 wt % to 45 wt % of binder component are kneaded well by three rollers to make a first dielectric layer paste for die coating or printing. The binder component is butyl carbitol acetate or terpineol including 1 wt % to 20 wt % of acrylic resin or ethyl cellulose. In addition, if necessary, as a plasticizer, dioctyl phthalate, dibutyl phthalate, triphenyl phosphate, and tributyl phosphate may be added to the paste, and, for example, glycerol monooleate, sorbitan sesquioleate, and phosphoric ester of an alalkyl group may be added to the paste as a dispersant, thereby improving printability.

The first dielectric layer paste is printed on front glass substrate 3 by a die coating method or a screen printing method so as to cover display electrodes 6. Then, the dielectric layer paste is dried and baked.

Next, second dielectric layer 82 will be described. A dielectric material forming second dielectric layer 82 has the following material composition. That is, the dielectric material includes 5 wt % to 40 wt % of bismuth oxide ($Bi_2O_3$) and 6.0 wt % to 28 wt % of barium oxide (BaO), and further includes 0.1 wt % to 7 wt % of at least one of molybdenum oxide ($MoO_3$), tungsten oxide ($WO_3$), cerium oxide ($CeO_2$), and manganese oxide ($MnO_2$).

Furthermore, the dielectric material includes 0.8 wt % to 17 wt % of at least one of calcium oxide (CaO) and strontium oxide (SrO).

The dielectric material may include 0.1 wt % to 7 wt % of at least one of copper oxide (CuO), chrome oxide ($Cr_2O_3$), cobalt oxide ($CO_2O_3$), vanadium oxide ($V_2O_7$), and antimony oxide ($Sb_2O_3$), instead of molybdenum oxide ($MoO_3$), tungsten oxide ($WO_3$), cerium oxide ($CeO_2$), and manganese oxide ($MnO_2$).

Further, as components other than the above, the dielectric material may include material compositions not containing lead, such as 0 wt % to 40 wt % of zinc oxide (ZnO), 0 wt % to 35 wt % of boron oxide ($B_2O_3$), 0 wt % to 15 wt % of silicon oxide ($SiO_2$), and 0 wt % to 10 wt % of aluminum oxide ($Al_2O_3$).

The dielectric material having the above composition is ground by wet jet milling or ball milling such that an average particle diameter is in a range of 0.5 μm to 2.5 μm, thereby making dielectric material powder. Then, 55 wt % to 70 wt % of dielectric material powder and 30 wt % to 45 wt % of binder component are kneaded well by three rollers to make a second dielectric layer paste for die coating or printing. The binder component is butyl carbitol acetate or terpineol including 1 wt % to 20 wt % of acrylic resin or ethyl cellulose. In addition, if necessary, as a plasticizer, dioctyl phthalate, dibutyl phthalate, triphenyl phosphate, and tributyl phosphate may be added to the paste, and, for example, glycerol monooleate, sorbitan sesquioleate, and phosphoric ester of an alalkyl group may be added to the paste as a dispersant, thereby improving printability.

The second dielectric layer paste is printed on first dielectric layer 81 by a die coating method or a screen printing method. Then, the dielectric layer paste is dried and baked.

As the thickness of dielectric layer 8 is reduced, the brightness of the PDP increases and a discharge voltage decreases. Therefore, it is preferable that the thickness of dielectric layer 8 be as small as possible as long as a withstand voltage is not lowered. In this embodiment of the invention, considering these conditions and the transmittance of visible light, the thickness of dielectric layer 8 is set to be equal to or smaller than 41 μm, the thickness of first dielectric layer 81 is set in a range of 5 μm to 15 μm, and the thickness of second dielectric layer 82 is set in a range of 20 μm to 36 μm.

Further, in this embodiment of the invention, each layer of dielectric layer 8 contains 5 wt % to 40 wt % of bismuth oxide ($Bi_2O_3$). This content is set considering the softening temperature of the dielectric layer, and it is preferable that each layer of the dielectric layer contains 5 wt % to 25 wt % of bismuth oxide. When the content of the bismuth oxide ($Bi_2O_3$) is reduced, coloring hardly occurs, and image display quality is improved. In addition, since bismuth is rare and expensive, it is possible to reduce material costs. Further, it is possible to reduce the power consumption of PDPs by decreasing the dielectric constant of dielectric layer 8.

However, if the content of bismuth oxide ($Bi_2O_3$) is reduced, there is a problem in that the softening temperature increases. However, it is possible to prevent the increase in the softening temperature by adding an additive such as alkali metal.

Furthermore, the alkali metal of dielectric layer 8 is likely to generate yellowing with silver (Ag) in metal bus electrodes 4b and 5b due to a reduction action. However, in this embodiment of the invention, as described above, a metal oxide is added to metal bus electrodes 4b and 5b as an additive. Therefore, the oxidation nature of the metal oxide can prevent the yellowing.

As such, in this embodiment of the invention, the display electrode and the dielectric layer are made of a glass material including a bismuth oxide or a zinc oxide, not including lead. Therefore, it is possible to achieve a PDP having a small environmental load.

Next, examples of the method of manufacturing the PDP according to this embodiment of the invention will be described.

Example 1

The following examination was conducted in order to confirm the effect of the embodiment of the invention. First, it was examined whether the glass material obtained by mixing the first material powder, which is the main glass material powder, with the second material powder, which is a glass material powder, serving as an additive, and melting the mixture could be vitrified. Whether the glass material could be vitrified was determined as follows.

That is, paste for electrodes was made using a glass material obtained by adding various oxides, serving as an additive, to Bi—Zn—B—Si-based glass including a bismuth oxide ($Bi_2O_3$), a boron oxide ($B_2O_3$), a zinc oxide (ZnO), and a silicon oxide ($SiO_2$) as main ingredients, or Bi—B—Si-based glass including a bismuth oxide ($Bi_2O_3$), a boron oxide ($B_2O_3$), and a silicon oxide ($SiO_2$) as main ingredients. The paste was printed on a small glass substrate having a size of about 15 $cm^2$ by a screen printing method, and then exposed with a light intensity of 100 mj/$cm^2$ to 200 mj/$cm^2$. Then, the paste was developed with 0.1 wt % to 10 wt % of sodium carbonate solution, and then baked, thereby making an electrode film sample.

When the main glass material powder is the Bi—B—Si-based glass, the glass material includes 30 wt % to 35 wt % of bismuth oxide, 40 wt % to 45 wt % of boron oxide, and 15 wt % to 25 wt % of silicon oxide, and it was determined whether a glass material obtained by changing the mixture ratio of these glass materials and the metal oxide, which is an additive, could be vitrified.

Meanwhile, when the main glass material powder is the Bi—Zn—B—Si-based glass, the glass material includes 25 wt % to 30 wt % of bismuth oxide, 20 wt % to 25 wt % of zinc oxide, 30 wt % to 35 wt % of boron oxide, and 10 wt % to 20 wt % of silicon oxide, and it was determined whether a glass material obtained by changing the mixture ratio of these glass materials and the metal oxide, which is an additive, could be vitrified.

As the result of the examination, the strength of the electrode films was weakened according to the ratio of the additive, the adhesion between the electrode films and a glass substrate was weakened and the electrode films were likely to be peeled off from the glass substrate, or uneven adhesion occurs partially. These phenomena show that the glass material is abnormally vitrified.

Table 1 shows the results when the main glass material is the Bi—B—Si-based glass, and Table 2 shows the results when the main glass material is the Bi—Zn—B—Si-based glass.

TABLE 1

| Additive | Content (wt %) | Vitrification |
|---|---|---|
| $MoO_2$ | 10 | X |
|  | 5 | ○ |
|  | 3 | ○ |
|  | 1 | ○ |
| $CuO_2$ | 10 | Δ |
|  | 5 | ○ |
|  | 3 | ○ |
|  | 1 | ○ |
| $SnO_2$ | 10 | Δ |
|  | 5 | ○ |
|  | 3 | ○ |
|  | 1 | ○ |
| $MnO_2$ | 10 | Δ |
|  | 5 | ○ |
|  | 3 | ○ |
|  | 1 | ○ |
| $CeO_2$ | 10 | X |
|  | 5 | ○ |
|  | 3 | ○ |
|  | 1 | ○ |
| $RuO_2$ | 10 | X |
|  | 5 | Δ |
|  | 3 | ○ |
|  | 1 | ○ |
| $SbO_2$ | 10 | X |
|  | 5 | ○ |
|  | 3 | ○ |
|  | 1 | ○ |

(where, in the result of determination of whether vitrification is possible, ○ indicates that vitrification is possible, Δ indicates that a portion of the glass material is not vitrified, and X indicates that the glass material is not vitrified).

TABLE 2

| Additive | Content (wt %) | Vitrification |
|---|---|---|
| $MoO_2$ | 10 | X |
|  | 5 | Δ |
|  | 3 | ○ |
|  | 1 | ○ |
| $CuO_2$ | 10 | X |
|  | 5 | ○ |
|  | 3 | ○ |
|  | 1 | ○ |
| $SnO_2$ | 10 | Δ |
|  | 5 | ○ |
|  | 3 | ○ |
|  | 1 | ○ |
| $MnO_2$ | 10 | Δ |
|  | 5 | ○ |
|  | 3 | ○ |
|  | 1 | ○ |
| $CeO_2$ | 10 | X |
|  | 5 | ○ |
|  | 3 | ○ |
|  | 1 | ○ |
| $RuO_2$ | 10 | X |
|  | 5 | Δ |
|  | 3 | ○ |
|  | 1 | ○ |
| $SbO_2$ | 10 | X |
|  | 5 | ○ |
|  | 3 | ○ |
|  | 1 | ○ |

(where, in the result of determination of whether vitrification is possible, ○ indicates that vitrification is possible, Δ indicates that a portion of the glass material is not vitrified, and X indicates that the glass material is not vitrified).

Tables 1 and 2 show that the content of the metal oxide, which is an additive, is preferably 5 wt % or less in the glass material, and the content of the metal oxide is preferably 3 wt % or less in the glass material, considering the stability of vitrification without depending on the basic composition of the main glass material.

Example 2

The number of bubbles generated from dielectric layer 8 was measured using a sample in which black electrodes 41b and 51b and white electrodes 42b and 52b were formed at an electrode gap of 60 μm to 70 μm so as to be suitable for a front panel of a 42-inch high-definition television and dielectric layer 8 was formed so as to cover the front panel. In this case, the electrodes and dielectric layer 8 were made of a glass material using Bi—B—Zn—Si-based glass or Bi—B—Si-based glass.

The number of bubbles was measured by radiating incident light onto dielectric layer 8 from the upper side after dielectric layer 8 is formed and detecting light reflected from the surface of dielectric layer 8 using a detector. In addition, only the bubbles having a diameter that is equal to or larger than 30 μm were detected.

Figure 3:
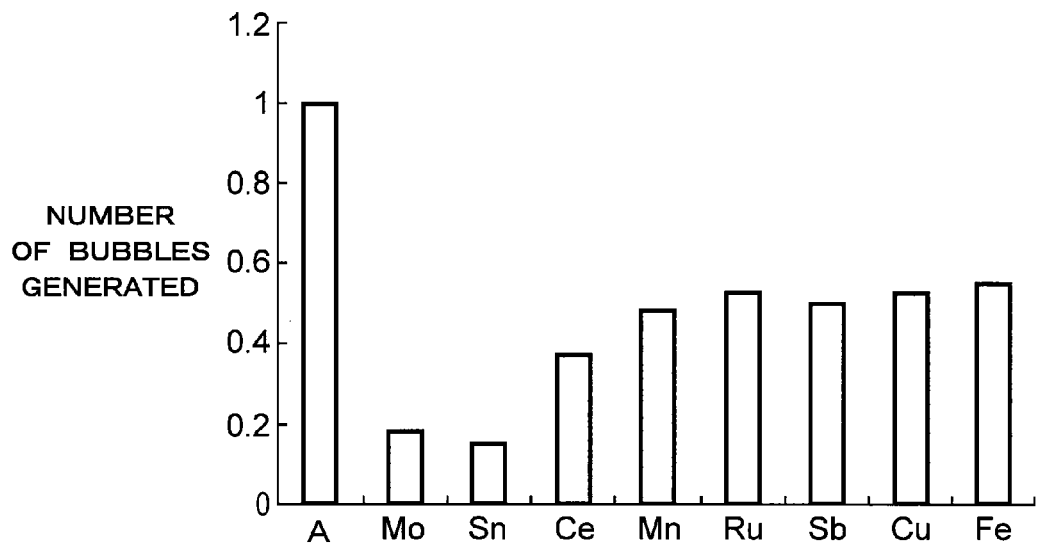
FIG. 3 is a diagram illustrating the number of bubbles generated from a dielectric layer when the dielectric layer is formed on black electrodes of the PDP.
Figure 4:
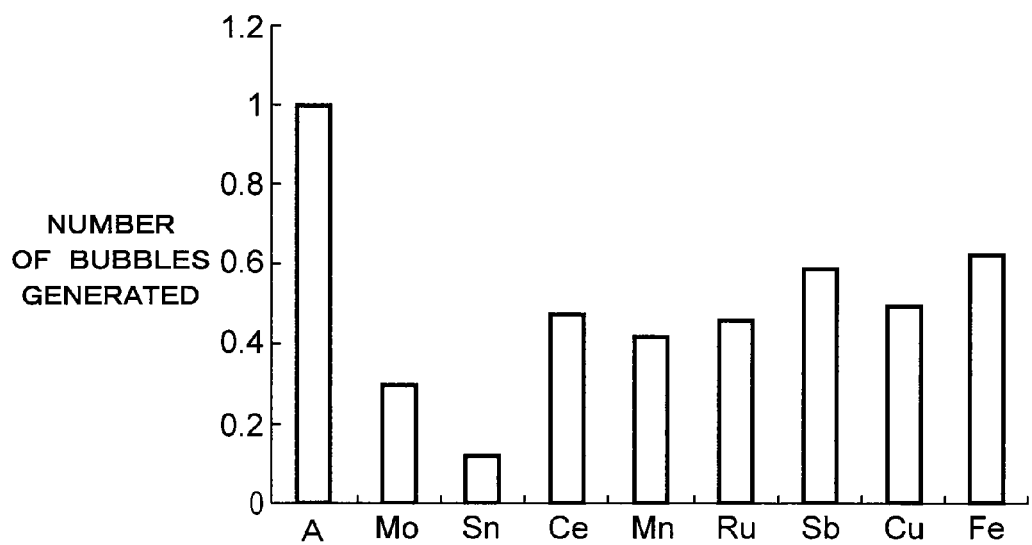
FIG. 4 is a diagram illustrating the number of bubbles generated from the dielectric layer when the dielectric layer is formed on white electrodes of the PDP.

FIG. 3 is a diagram illustrating the number of bubbles generated from dielectric layer 8 when dielectric layer 8 is formed on black electrodes 41b and 51b of PDP 1 according to this embodiment of the invention. FIG. 4 is a diagram illustrating the number of bubbles generated from dielectric layer 8 when dielectric layer 8 is formed on white electrodes 42b and 52b of PDP 1 according to this embodiment of the invention. In FIGS. 3 and 4, the vertical axis indicates the number of bubbles, and the number of bubbles generated from glass material A not containing a metal oxide as an additive is represented by 1. In addition, the content of the metal oxide, which is the additive, is constant, for example, 0.3 wt %.

As can be seen from FIGS. 3 and 4, the number of bubbles generated from the glass material containing the metal oxide as an additive is smaller than that generated from the glass material without a metal oxide. When comparing the bubble reduction effects of the metal oxides, the bubble reduction effect was increased in all of black electrodes 41b and 51b and white electrode 42b and 52b containing a metal oxide of molybdenum or tin added thereto.

Further, in black electrodes 41b and 51b, ruthenium was effective since it had a higher degree of blackness and higher contrast than other elements during image display. When dielectric layer 8 was formed of a material containing a copper oxide (CuO) added thereto, interfaces between dielectric layer 8 and white electrodes 42b and 52b were stabilized by adding a copper oxide (CuO) to a glass material forming white electrodes 42b and 52b, since the contact area between white electrode 42b and 52b and dielectric layer 8 was large.

Example 3

Figure 5:
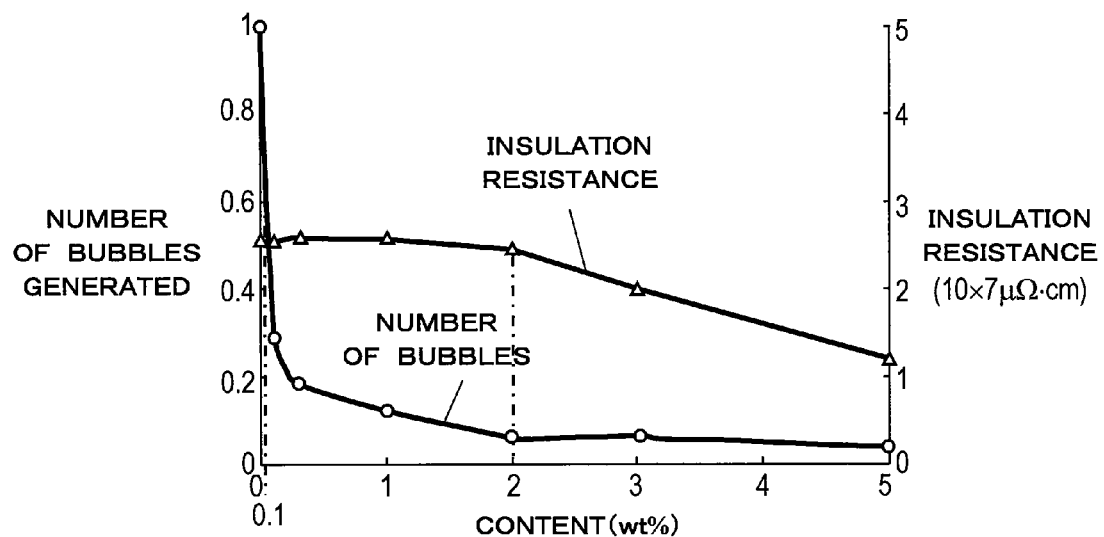
FIG. 5 is a diagram illustrating the relationship among the content of a metal oxide in the black electrode of the PDP, the insulation resistance of the electrode, and the number of bubbles generated.
Figure 6:
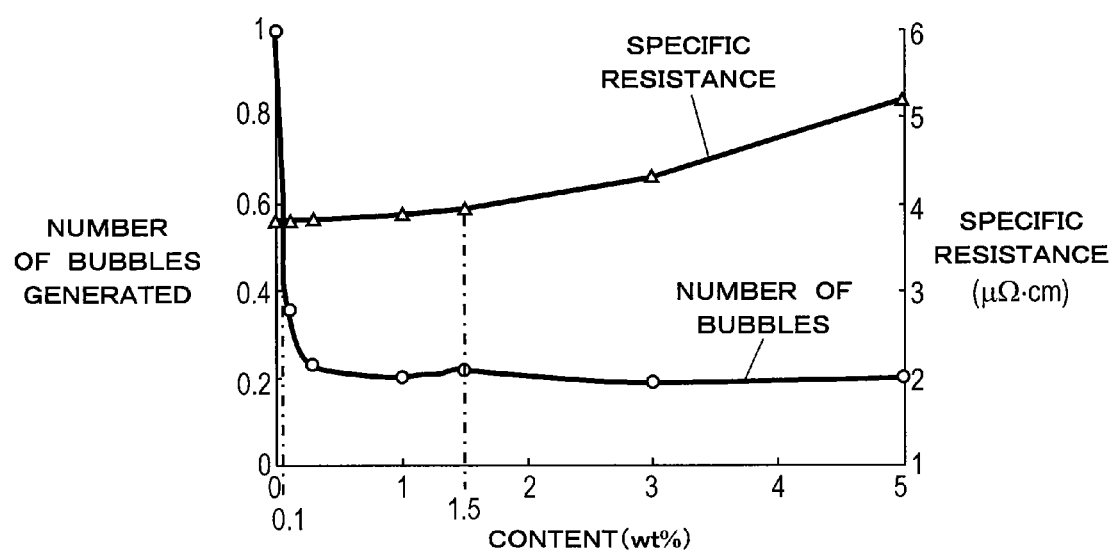
FIG. 6 is a diagram illustrating the relationship among the content of the metal oxide in the white electrode of the PDP, the specific resistance of the electrode, and the number of bubbles generated.

Meanwhile, when the metal oxide is added to the glass material, there is a fear that the resistance of the electrode will be increased. FIG. 5 is a diagram illustrating the relationship among the content of the metal oxide in the black electrode of the PDP according to the embodiment of the invention, the insulation resistance of the electrode, and the number of bubbles generated. FIG. 6 is a diagram illustrating the relationship among the content of the metal oxide in the white electrode of the PDP, the insulation resistance of the electrode, and the number of bubbles generated. In FIGS. 5 and 6, the vertical axis indicates the number of bubbles generated, and the number of bubbles when no metal oxide is added is represented by 1.

In this case, a tin oxide (SnO) was contained in the glass materials forming the two types of electrodes, and the content thereof was changed from 0 wt % to 5 wt %, which is a boundary value of vitrification.

The resistances of black electrodes 41b and 51b and white electrodes 42b and 52b, which were patterned in a predetermined shape, for example, a strip shape on the glass substrate and then baked, in the direction of the substrate surface was measured, and the specific resistance thereof was calculated. In addition, terminals for measurement were formed in the black electrode to measure the insulation resistance thereof. From these resistance values and the dimensions of the electrodes, specific insulation resistance was calculated from the black electrode and the specific resistance was calculated from the white electrode. The number of bubbles generated was measured on the basis of the result measured using the sample.

As can be seen from FIG. 5, it is effective to increase the content of the metal oxide in order to prevent the generation of bubbles from the black electrode. However, when the black electrodes and the light shielding layers are formed of the same material and by the same process, it is necessary to ensure electrical insulation between scanning electrodes 4 and sustain electrodes 5. In this case, in front panel 2 of PDP 1, in order to prevent discharge errors due to the migration of charge between scanning electrodes 4 and sustain electrodes 5, it is necessary to maintain the electrical insulation of light shielding layer 7 at a high level. In order to meet the necessities, from the result of FIG. 5, it is preferable that the content of the metal oxide in the glass material be 2 wt % or less. When the content of the metal oxide is equal to or higher than 2 wt %, the specific insulation resistance is reduced, that is, the electrical insulation is sharply reduced. Therefore, it is preferable that the content of the metal oxide in the glass material forming black electrodes 41b and 51b be in a range of 0.1 wt % to 2 wt %.

As can be seen from FIG. 6, it is also effective to increase the content of the metal oxide in order to prevent the generation of bubbles from white electrodes 42b and 52b. However, it is necessary to ensure the conductivity of metal bus electrodes 4b and 5b in order to reduce the power consumption of the PDP. In order to meet the necessities, from the result of FIG. 6, it is preferable that the content of the metal oxide in the glass material be 1.5 wt % or less. When the content of the metal oxide is equal to or higher than 1.5 wt %, the specific resistance increases, that is, the conductivity is sharply lowered. Therefore, it is preferable that the content of the metal oxide in the glass material forming white electrodes 42b and 52b be in a range of 0.1 wt % to 1.5 wt %.

Figure 7:
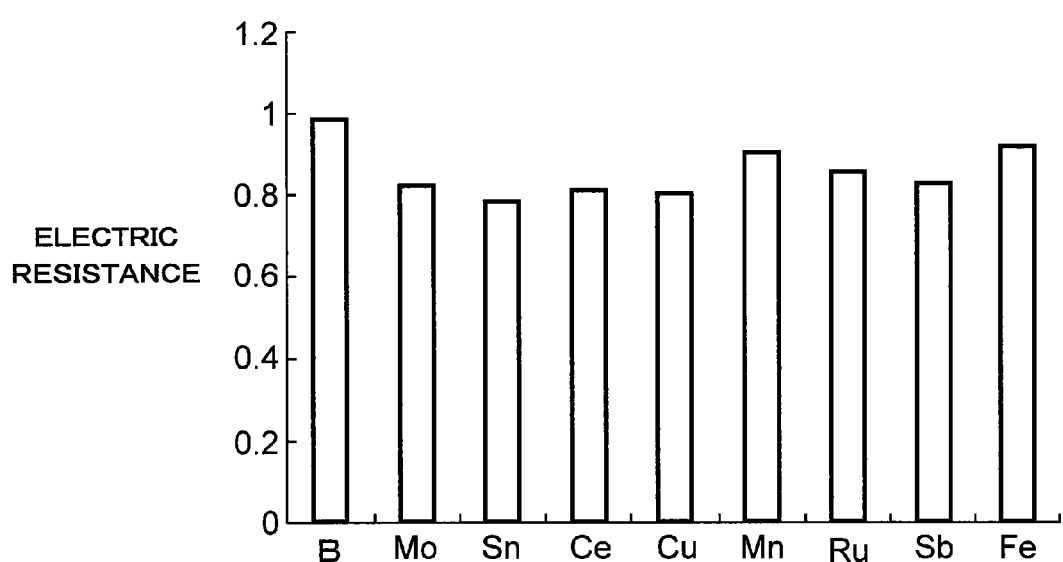
FIG. 7 is a diagram illustrating the electric resistance of display electrodes when the dielectric layer is formed on the display electrodes of the PDP.

FIG. 7 is a diagram illustrating a variation in the electric resistance of display electrodes 6 when dielectric layer 8 is formed on display electrodes 6 of PDP 1 according to the embodiment of the invention. In the measurement of the electric resistance of display electrodes 6, PDP 1 corresponding to a 42-inch high-definition television was manufactured, the electric resistance was measured after the display electrodes 6 were formed, and the electric resistance of display electrodes 6 after dielectric layer 8 was formed on display electrodes 6 was measured. FIG. 7 shows the ratio of the electric resistance after dielectric layer 8 is formed to the electric resistance after display electrodes 6 are formed, in which variation B in electric resistance when no metal oxide, serving as an additive, is added to the glass material forming display electrodes 6 is represented by 1. In addition, separate lead electrodes are formed to measure the electric resistance after dielectric layer 8 is formed. Therefore, the measurement is not affected by the contact resistance of dielectric layer 8.

As can be seen from the result shown in FIG. 7, the electric resistance of the display electrode made of a glass material containing any metal oxide is lower than that of sample B without containing a metal oxide, after dielectric layer 8 is formed. This result proves that a metal component of the metal oxide makes it possible to reduce the resistances of transparent electrodes 4a and 5a, black electrodes 41b and 51b, and white electrodes 42b and 52b in the cross-sectional direction of the electrodes. It is considered that this is because the metal component of the metal oxide contained in black electrodes 41b and 51b is ionized due to heat history in the process of baking metal bus electrodes 4b and 5b and the process of backing dielectric layer 8 and then dispersed into transparent electrodes 4a and 5a or white electrodes 42b and 52b.

As described above, according to the PDP of the invention, the method of manufacturing the same, and the paste for display electrodes of the PDP, it is possible to provide a PDP capable of reducing the number of bubbles generated from the dielectric layer formed on the display electrodes, reducing discharge errors due to dielectric breakdown of the dielectric layer, and obtaining high manufacturing yield and high image display quality.

Furthermore, in the above-described embodiment of the invention, a metal bus electrode has a two-layer structure of a black electrode and a white electrode, but the invention is not limited thereto. A single-layer metal bus electrode may be used to reduce bubbles generated from the dielectric layer. In addition, the invention may be applied to a front panel of a PDP in which a dielectric layer coveting the display electrodes has a single-layer structure or a multi-layer structure.

INDUSTRIAL APPLICABILITY

As described above, according to the PDP of the invention, the method of manufacturing the same, and the paste for display electrodes of the PDP, it is possible to prevent the generation of bubbles from the dielectric layer, and improve the manufacturing yield of PDPs having a large screen and high resolution.

The invention claimed is:
1. A plasma display panel comprising:
a pair of substrates which are opposite to each other and one of which includes a display electrode and a dielectric layer formed thereon, wherein:
the display electrode is a baked electrode formed by baking an electrode material paste, the electrode material paste including a glass material powder and an organic resin binder, the glass material powder is made by grinding a glass material, the glass material containing at least one oxide of molybdenum, cerium, copper, tin, manganese, ruthenium, antimony, and iron, and the glass material powder includes less than 40 wt % and not less than 15 wt % of a bismuth oxide, 3-20 wt % of a silicon oxide, and 10-45 wt % of a boron oxide.

2. The plasma display panel of claim 1,
wherein softening temperature of the glass material powder is in a range of 400° C. to 550° C.

3. The plasma display panel of claim 1,
wherein the glass material includes a zinc oxide.

4. A method of manufacturing a plasma display panel including a pair of substrates which are opposite to each other and one of which includes a display electrode and a dielectric layer formed thereon, the method comprising:
a step of forming the display electrode,
wherein the step of forming the display electrode includes:
a material powder mixing step of mixing and dispersing a first material powder including less than 40 wt % and not less than 15 wt % of a bismuth oxide, 3-20 wt % of a silicon oxide, and 10-45 wt % of a boron oxide with a second material powder including at least one oxide of molybdenum, ruthenium, cerium, tin, copper, manganese, antimony, and iron;
a molten glass making step of melting the material powder, which is mixed and dispersed in the material powder mixing step, at a predetermined temperature to make molten glass, and cooling the molten glass, the cooled molten glass including said at least one oxide;
a glass material powder making step of grinding the cooled molten glass to make a glass material powder including said at least one oxide;
an electrode material making step of kneading an organic resin binder with the glass material powder including said at least one oxide to make an electrode material paste; and
an electrode material applying step of applying the electrode material paste on the substrate.

5. The method of manufacturing a plasma display panel of claim 4,
wherein, in the material powder mixing step, a content of the second material powder is in a range of 0.1 wt % to 5 wt %.

6. A paste for a display electrode of a plasma display panel, the paste comprising:
a glass material powder made by grinding a glass material, the glass material including at least one oxide of molybdenum, ruthenium, cerium, tin, copper, manganese, antimony, and iron, melting the mixture, and grinding the molten glass; and
an organic resin binder,
the glass material is obtained by mixing a first material powder including less than 40 wt % and not less than 15 wt % of a bismuth oxide, 3-20 wt % of a silicon oxide, and 10-45 wt % of a boron oxide with a second material powder including at least one oxide of molybdenum, ruthenium, cerium, tin, copper, manganese, antimony, and iron, melting the mixture, and cooling the molten glass.

7. The paste for display electrodes of a plasma display panel of claim 6,
wherein a content of the second material powder in the glass material is in a range of 0.1 wt % to 5 wt %.

8. The plasma display panel of claim 2,
wherein the glass material includes a bismuth oxide or a zinc oxide.

9. The plasma display panel of claim 1,
wherein a content of said at least one oxide in the glass material is in a range of 0.1 wt % to 5 wt %.

10. The plasma display panel of claim 1, wherein each particle of the glass material powder contains said at least one oxide.

* * * * *